(12) United States Patent
Beranek (10) Patent No.: US 11,018,448 B2
(45) Date of Patent: May 25, 2021

(54) COVERING

(71) Applicant: Gerald Beranek, North Liberty, IA (US)

(72) Inventor: Gerald Beranek, North Liberty, IA (US)

( * ) Notice: Subject to any disclaimer, the term of this patent is extended or adjusted under 35 U.S.C. 154(b) by 0 days.

(21) Appl. No.: 15/503,545

(22) PCT Filed: Jul. 29, 2015

(86) PCT No.: PCT/US2015/042706
§ 371 (c)(1),
(2) Date: Feb. 13, 2017

(87) PCT Pub. No.: WO2016/019047
PCT Pub. Date: Feb. 4, 2016

(65) Prior Publication Data
US 2018/0219322 A1  Aug. 2, 2018

Related U.S. Application Data

(60) Provisional application No. 62/030,139, filed on Jul. 29, 2014.

(51) Int. Cl.
*H01R 13/52* (2006.01)
*H02G 3/14* (2006.01)
*H01R 25/00* (2006.01)

(52) U.S. Cl.
CPC ....... *H01R 13/5213* (2013.01); *H01R 25/006* (2013.01); *H02G 3/14* (2013.01)

(58) Field of Classification Search
CPC .. H01R 13/73; H01R 13/5213; H01R 25/006; H02J 7/0044; H04M 19/08
USPC ........................................ 439/536
See application file for complete search history.

(56) References Cited

U.S. PATENT DOCUMENTS

| | | | | |
|---|---|---|---|---|
| 7,812,257 B2 * | 10/2010 | Gunderman | .......... | H04M 19/08 174/66 |
| 9,252,610 B2 * | 2/2016 | Chen | ..................... | H02J 7/0042 |
| 2012/0139484 A1 * | 6/2012 | Gunderman | .......... | H02J 7/0044 320/108 |
| 2014/0030912 A1 * | 1/2014 | Cohen | .................... | H01R 13/73 439/529 |
| 2014/0179157 A1 * | 6/2014 | Gonzalez | ................. | H02G 3/14 439/535 |
| 2015/0129722 A1 * | 5/2015 | Green | ................... | H02J 7/0044 248/51 |

* cited by examiner

Primary Examiner — Jean F Duverne
(74) Attorney, Agent, or Firm — David M. Breiner; BrownWinick Law Firm (57) ABSTRACT

In accordance with example embodiments a cover may include an attachment member having at least one aperture and a shelf substantially perpendicular to the attachment member.

3 Claims, 12 Drawing Sheets

COVERING

CROSS REFERENCE TO RELATED APPLICATIONS

This application is a 371 of International Application No. PCT/US15/42706 filed on Jul. 29, 2015, which claims priority from U.S. Provisional Application No. 62/030,139, which was filed on Jul. 29, 2014. This application claims priority to each of the above referenced applications and the disclosures of each of the above-referenced applications are hereby incorporated by reference in their entirety.

BACKGROUND

1. Field

Example embodiments relate to a covering having a shelf upon which an object may be placed. In example embodiments, the covering may cover an outlet and thus may serve as an outlet cover.

2. Description of the Related Art

Electrical devices, for example, electrical outlets, are placed in spaces formed in a wall. Such spaces, however, are generally unsightly. Outlet covers are typically used to cover these spaces to make for a more aesthetically pleasing appearance. Conventional outlet covers typically resemble a flat plate with one or two openings. While conventional outlet covers typically serve their purpose for covering up the aforementioned spaces, they generally serve no other purpose.

SUMMARY

Applicants have developed a new outlet covering that not only presents an aesthetically pleasing structure but adds additional functionality to the cover.

In accordance with example embodiments a cover may include an attachment member having at least one aperture and a shelf substantially perpendicular to the attachment member.

BRIEF DESCRIPTION OF THE DRAWINGS

Example embodiments are described in detail below with reference to the attached drawing figures, wherein.

DETAILED DESCRIPTION

Example embodiments will now be described more fully with reference to the accompanying drawings, in which example embodiments of the invention are shown. The invention may, however, be embodied in different forms and should not be construed as limited to the example embodiments set forth herein. Rather, these example embodiments are provided so that this disclosure will be thorough and complete, and will fully convey the scope of the invention to those skilled in the art. As used herein, the term "and/or" includes any and all combinations of one or more of the associated listed items.

In this application it is understood that, although the terms first, second, etc. may be used herein to describe various elements and/or components, these elements and/or components should not be limited by these terms. These terms are only used to distinguish one element and/or component from another element and/or component. Thus, a first element and/or component discussed below could be termed a second element and/or component without departing from the teachings of example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a cover, for example, an outlet cover.

FIGS. 1A-1D are views of a cover 100 in accordance with example embodiments. As shown in FIGS. 1A-1D, the cover 100 may include an attachment member 10, a shelf 20, and a pair of stiffeners 30. In example embodiments the cover 100 may be configured to cover an outlet and thus may serve as an outlet cover.

Figure 1A:
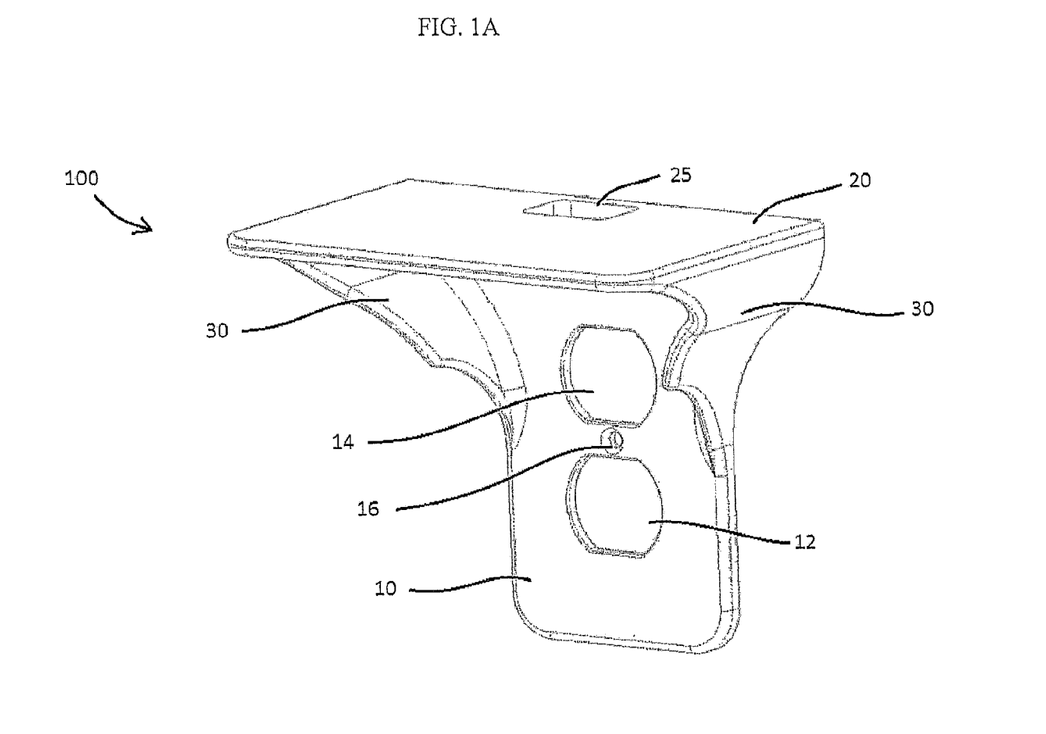
FIGS. 1A-1D are views of a cover in accordance with example embodiments.
Figure 1B:
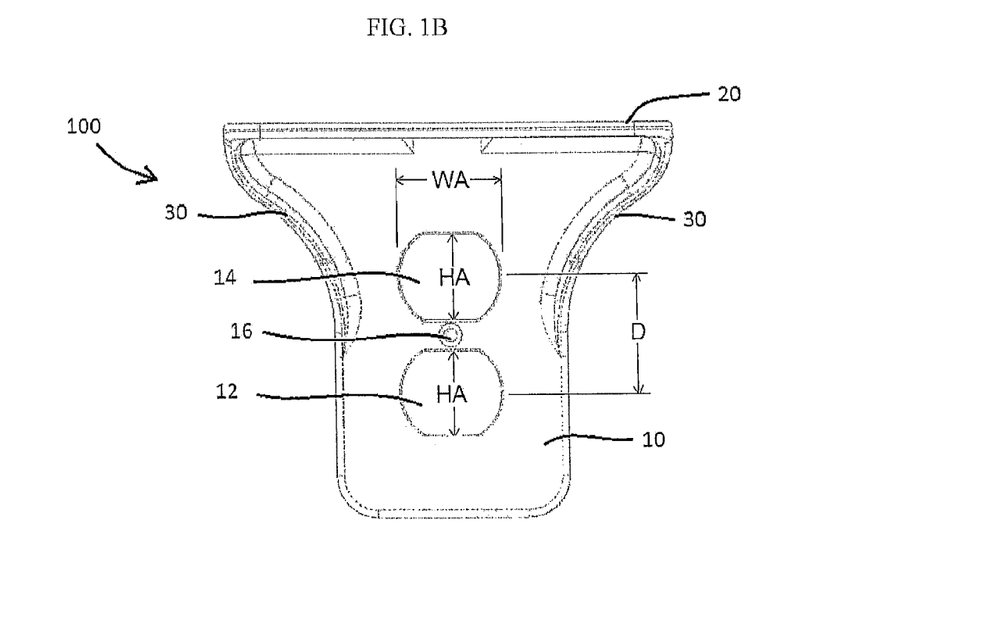
Figure 1C:
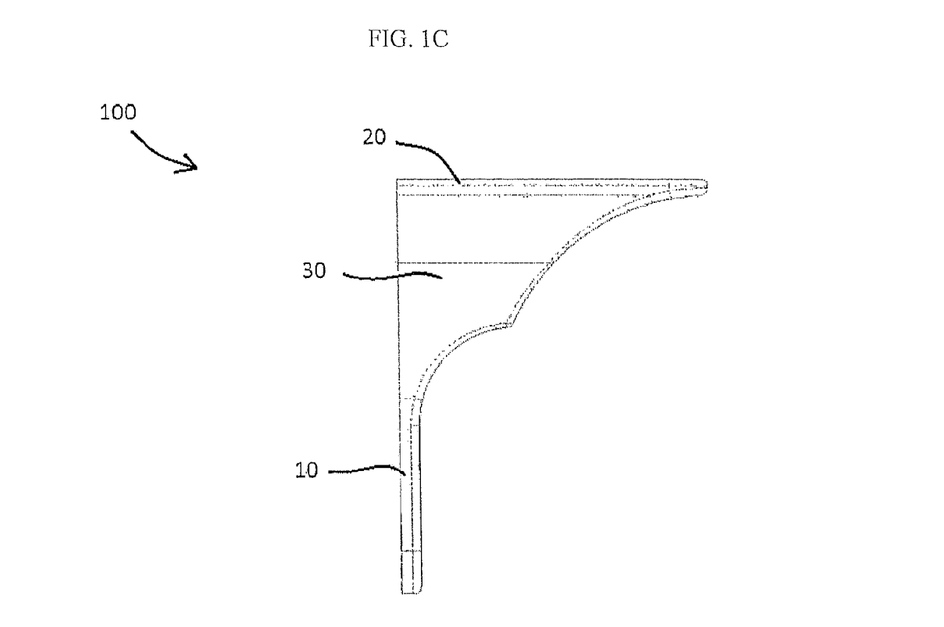
Figure 1D:
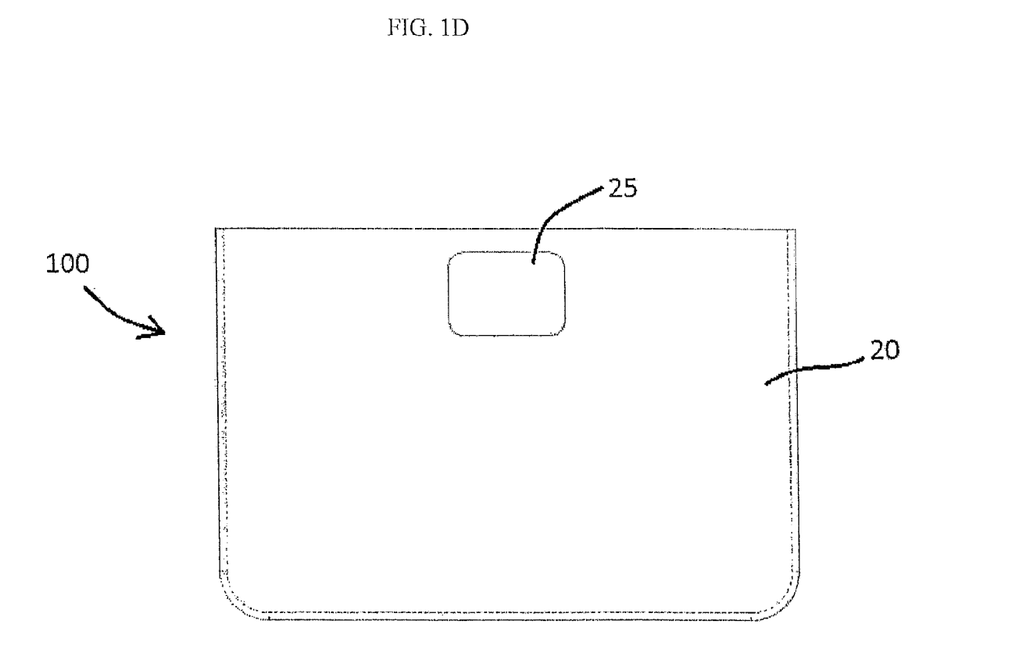

In example embodiments the attachment member 10 may resemble a flat plate having at least one aperture. For example, as shown in FIG. 1A, the attachment member 10 may have a first aperture 12 and a second aperture 14. In example embodiments the first and second apertures 12 and 14 may be configured to expose conventional electrical sockets, for example, electrical sockets associated with a common duplex socket. For example, sockets typically have widths of about 1.25 inches and a height of about 1 inch. Thus, the apertures 12 and 14 may have widths WA of about 1.25 inches and heights HA of about 1 inch. Furthermore, centers of the apertures 12 and 14 may be separated by a distance D of about 1.5 inches so the apertures 12 and 14 may accommodate conventional duplex sockets. The above dimensions are not intended to limit the invention since variations thereof may exist to which the inventive concepts may be applied. For example, in example embodiments, the apertures 12 and 14 may have a width ranging from about 1.25 inches to about 1.35 inches or 1.25 inches to about 1.5 inches and the heights may be about 1 inch to about 1.1 inches or one inch to about 1.25 inches. In addition, the number of apertures is also not meant to limit example embodiments. For example, in example embodiments, rather than having two apertures 12 and 14, the attachment member 10 may have only a single aperture or more than two apertures 12 and 14. Furthermore, the shape of the apertures is not intended to be limited by the shape of the apertures in the figures. For example, the apertures may be circular, elliptical, square and/or rectangular depending on the type of socket they are intended to expose.

In example embodiments, the attachment member 10 may further include at least one connecting aperture 16. In example embodiments, the at least one connecting aperture 16 may be configured to receive a connecting member, for example, a screw, to attach the cover 100 to an electrical socket. In example embodiments, the at least one connecting aperture 16 may be positioned between the first and second apertures 12 and 14 as shown in at least FIG. 1A, however, this is not meant to be a limiting feature of example embodiments. For example, in example embodiments, the at least one connecting aperture may be arranged in another area of the attachment member 10, for example, near a top or bottom thereof. In the alternative, the at least one connecting aperture 16 may be omitted it its entirety and another connecting means, for example, an adhesive, may be used to attach the attachment member 10 to either the electrical socket or a wall in which the electrical socket is placed.

In example embodiments the attachment member 10 may be a substantially flat member which may be configured to bear up against a wall into which an electrical device, for example, an electrical power outlet, is placed. As is well known in the art, such electrical devices are generally placed in a cavity which may have an irregular and coarse appearance. However, in example embodiments, the attachment member 10 is configured to be larger than the cavity. Thus, when installed, the cavity is covered by the aesthetically pleasing cover 100.

In example embodiments, the shelf 20 may be configured to be substantially perpendicular to the attachment member 10. For example, in example embodiments, the attachment member 10 may be a vertical member configured to bear up against a wall and the shelf 20 may form a substantially horizontal platform upon which objects may be placed. For example, in example embodiments, the shelf 20 may be a horizontal member without any incline with respect to the horizontal or may have a pitch which is an upward slope towards the attachment member 10. In example embodiments the shelf 20 may include an aperture 25. The aperture 25 may allow an electrical cord of an electronic device to pass therethrough or may serve an opening into which a connector of the electrical device may be inserted (for example, when the shelf 20 has an upward pitch the electrical device may have a hook or a protrusion that inserts into the aperture 25). Although the aperture 25 is illustrated as being rectangular, the invention is not limited thereto as the aperture 25 may have a different shape such as, but not limited to, a circular shape, an elliptical shape, or a polygonal shape.

In example embodiments the stiffeners 30 may attach to each of the shelf 20 and the attachment member 10. In example embodiments, the stiffeners 30 may stiffen the cover 100 so that the cover 100 is a substantially rigid structure. Due to the presence of the stiffeners 30, the shelf 20 has less tendency to deform in the event a relatively heavy member is placed thereon. Although example embodiments illustrate the cover 100 as including stiffeners 30, the invention is not limited thereto as the stiffeners 30 may, in an alternative embodiment, be omitted.

Figure 2:
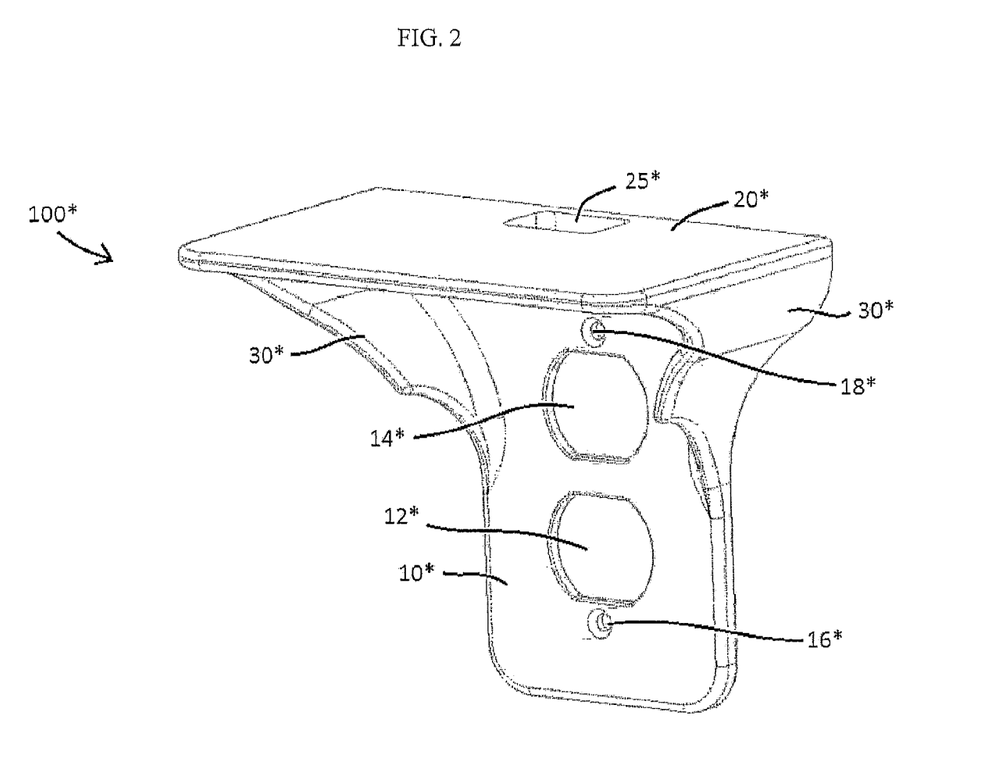
FIG. 2 is a view of a cover in accordance with example embodiments.
Figure 3A:
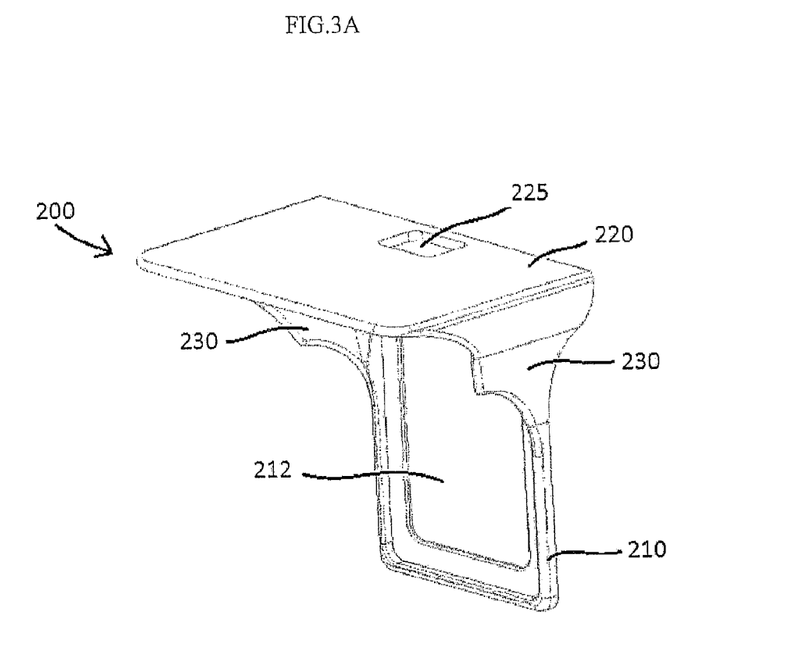
FIGS. 3A-3D are views of a cover in accordance with example embodiments.
Figure 3B:
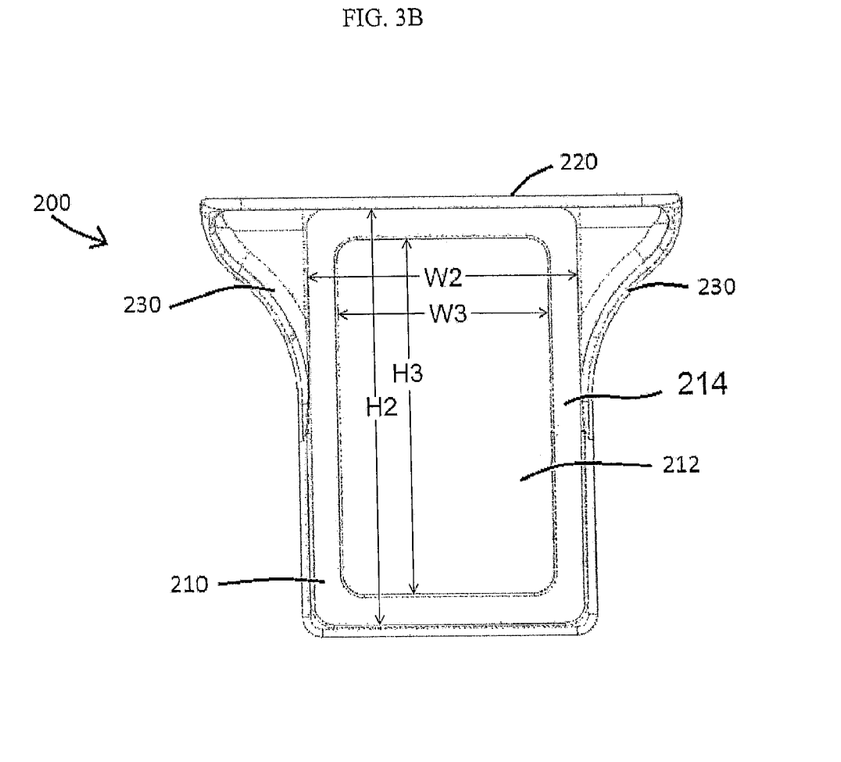
Figure 3C:
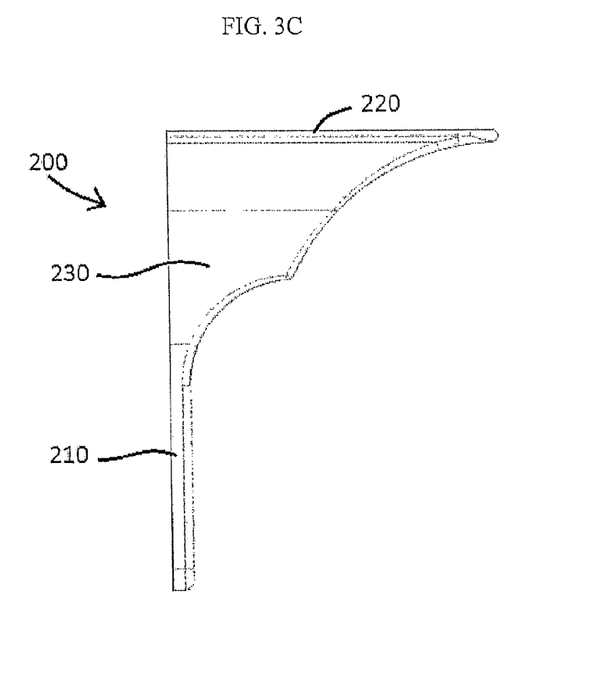
Figure 3D:
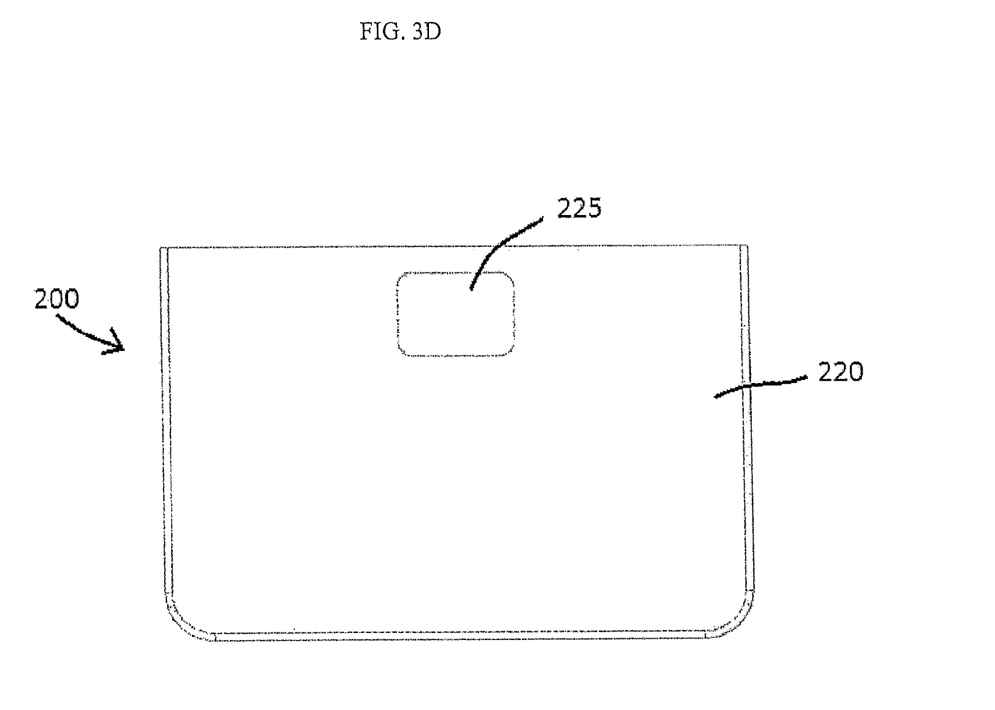

FIG. 2 is another nonlimiting example of a cover 100*. In example embodiments the cover 100* may be substantially similar to the cover 100. For example, the cover 100*, as shown in FIG. 2, may have an attachment member 10*, a first aperture 12*, a second aperture 14*, stiffeners 30*, and a platform 20* which may be substantially identical to the attachment member 10, the first aperture 12, the second aperture 14, the stiffeners 30, and the platform 20. However, in example embodiments, rather than having one connecting aperture 16, the attachment member 10* includes a pair of connecting apertures 16* and 18*. This arrangement of apertures 16* and 18* may allow the cover 100* to attach differently to a wall socket (for example, by two screws rather than one screw) or to a different kind of wall socket than the cover 100 may attach to.

FIGS. 3A-3D illustrate a cover 200 in accordance with example embodiments. Like cover 100, the cover 200 may include an attachment member 210, a pair of stiffeners 230, and a shelf 220 having an aperture 225. Because the stiffeners 230 and shelf 220 may be substantially identical to the stiffeners 30 and shelf 20, a detailed description thereof will be omitted for the sake of brevity.

Figure 4A:
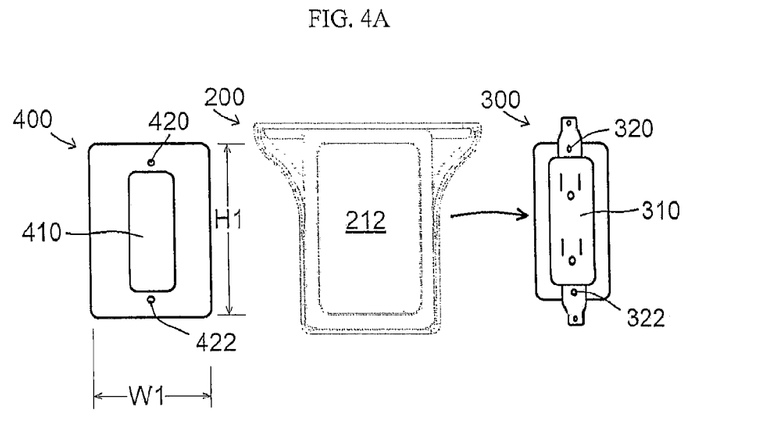
FIGS. 4A-4C are views of a cover being fixed to a wall in accordance with example embodiments.

In example embodiments, the attachment member 210 may include an aperture 212. Between the outer perimeter of the attachment member 210 and the aperture 212 may be a lip 214 into which a conventional socket cover 400 may be placed. For example, as shown in FIG. 4A, a system comprising a socket 300, the cover 200, and the conventional cover 400 may be provided. It is understood that in the example of FIGS. 4A-4C the socket 300 is installed in a space 650 formed in a wall 600. In the conventional art the conventional socket cover 400 may have a height H1 of about 4.5 inches and a width W1 of about 2.75 inches and the lip 214 may have a perimeter defined by a height H2 of greater than about 4.5 inches and a width W2 of greater than about 2.75 inches. The aperture 212 may have a height H3 of greater than about 2.5 inches (for example about 2.5 inches, 3 inches, 3.5 inches, or 4 inches) and a width W3 of greater than about 1.25 inches (for example, 1.25 inches, 1.5 inches, 2 inches, or 2.25 inches). The instant dimensions are exemplary only and are not meant to limit example embodiments.

Figure 4B:
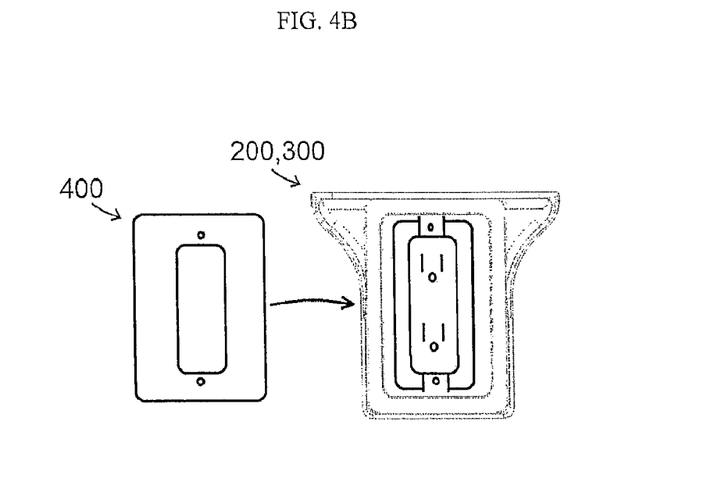
Figure 4C:
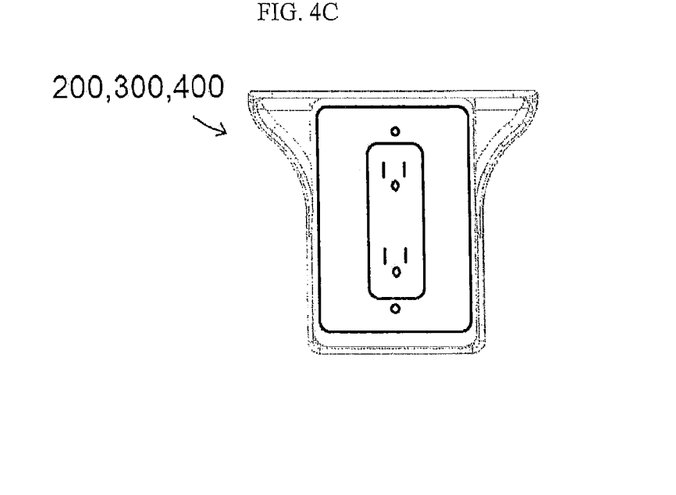

In the conventional art, the socket 300 may include a pair of holes 320 and 322 which may have a same spacing as holes 420 and 422 of a conventional socket cover 400. In the conventional art, the conventional socket cover 400 is placed over the socket 300 so that holes 420 and 422 overlie holes 320 and 322. Fasteners, for example, screws, are then used to connect the conventional socket cover 400 to the conventional socket 300. In example embodiments, however, the cover 200 may be placed over the socket 300 so that the aperture 212 exposes the socket as shown in FIG. 4B. The conventional cover 400 may then be placed over lip 214 so that the holes 420 and 422 of the conventional cover 400 overlie the holes 320 and 322 of the socket. Screws may then be used to attach the conventional socket cover 400 to the socket 300. Attaching the conventional socket cover 400 to the socket 300 sandwiches the lip 214 of the cover 200 between the conventional socket cover 400 and a wall into which the socket 300 is placed thereby securing the cover 200 in place.

In example embodiments, the height and width of the aperture 212 are generally smaller than the height and width of the conventional socket cover 400 to prevent the conventional socket cover 400 from passing through and yet large enough to expose the a conventional socket 300. As is well known in the art, the conventional socket cover 400 includes an aperture 410 to allow the socket 300 to be exposed so that a plug from an electrical device may be plugged therein.

Figure 5:
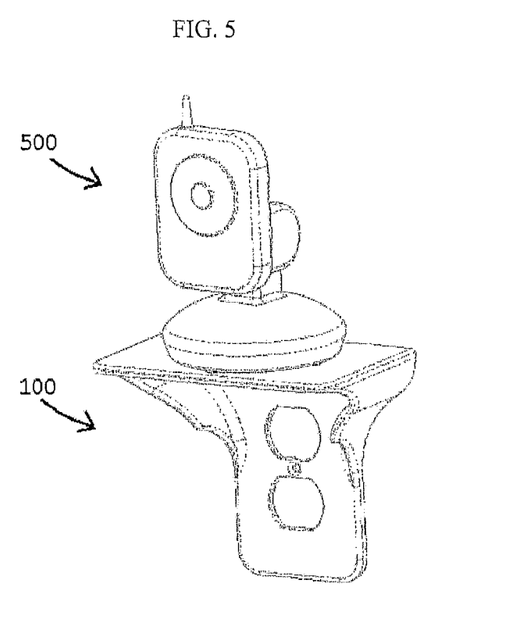
FIG. 5 is a view of a cover supporting an electrical device in accordance with example embodiments.
Figure 6:
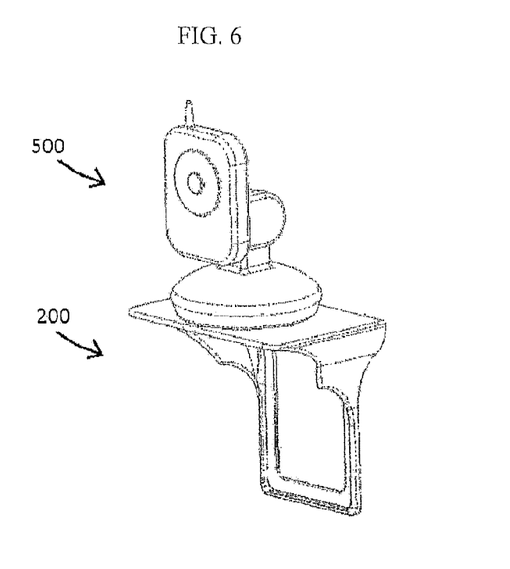
FIG. 6 is a view of a cover supporting an electrical device in accordance with example embodiments.

FIGS. 5 and 6 illustrate the shelves 100 and 200 supporting an electrical device 500. In example embodiments, the electrical devices may be, but are not limited to, cameras, shaving equipment, and radios. As is clear from example embodiments, the covers 100, 100\*, and 200 provide a useful platform upon which a device may be set while keeping the device near an electrical outlet.

Although example embodiments have stressed that the covers 100 and 200 are usable with electrical outlets, the invention is not limited thereto. For example, in example embodiments, the covers 100 and 200 may be used with light switches and emergency lights, for example, a flashlight, may be placed on the shelf above the light switch.

Figure 7A:
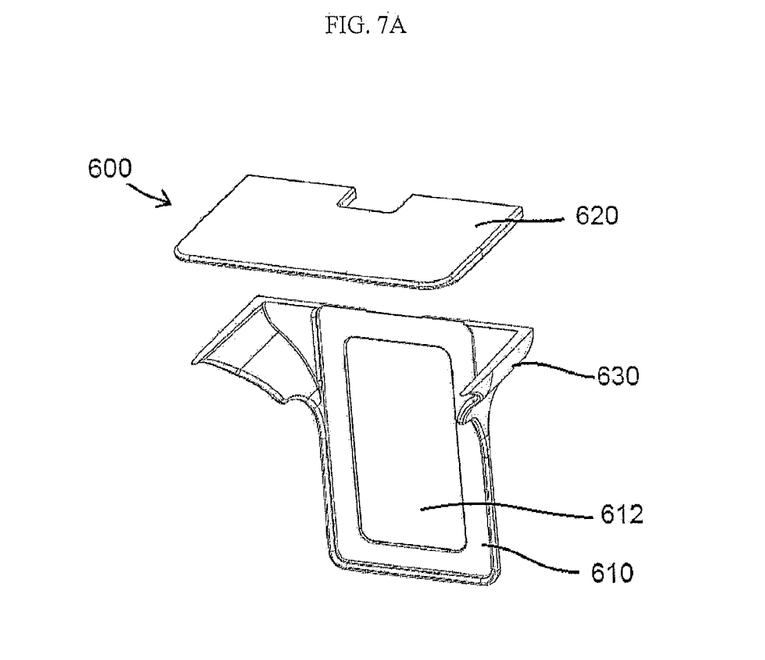
FIGS. 7A-7B illustrate views of a cover in accordance with example embodiments.
Figure 7B:
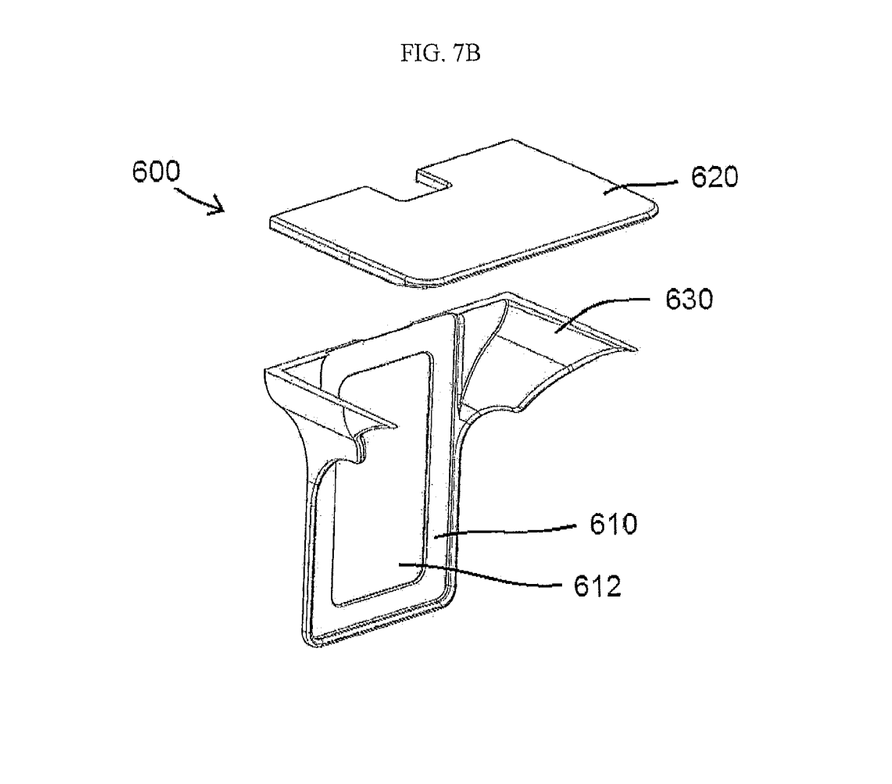

In example embodiments the cover 100, 100\*, and 200 may be made from various materials. For example, each of the covers 100, 100\* and 200 may be made from plastic, wood, composite material, and/or a metal. Furthermore, the covers 100, 100\* and 200 may be made from a casting process or a 3-D printing process and therefore may be an integral structure. On the other hand, each of the attachment members, stiffeners, and shelves may be individually fabricated and then joined together via a joining process such as, but not limited to welding, screwing, riveting, and gluing. FIG. 7, for example illustrates a cover 600 substantially identical to the cover 200 except that the cover 600 has a shelf 620 and an attachment member 610 separately formed. In this particular nonlimiting example embodiment, the attachment member 610, like attachment member 210, may include an aperture 612 configured to expose an electrical socket and a lip which may be sandwiched between a conventional cover 400 and a wall. In this example, ends of the attachment member 610 may be configured so that the shelf 620 and the attachment member may be in sliding engagement with one another. For example, ends of one of the attachment member 610 and the shelf 620 may include slots configured to receive ridges of the other of the attachment member 610 and shelf 620 such that the ridges may be inserted into the slots to allow for the attachment member 610 and the shelf 620 to attach to one another. In the alternative, ends of one of the attachment member 610 and the shelf 620 may be configured to snap onto the other of the attachment member 610 and the shelf 620.

In example embodiments the shelf 600 (or any of the shelves in this application) may be hinge connected to their attachment members. As such, the shelf 600 may be rotated upward or downward relative to the attachment member 610. In addition, the stiffeners 630 may likewise be hinge connected to the attachment member 610. This latter embodiment may allow for the stiffeners 630 to be rotated into substantial alignment with the attachment member 610.

Figure 8:
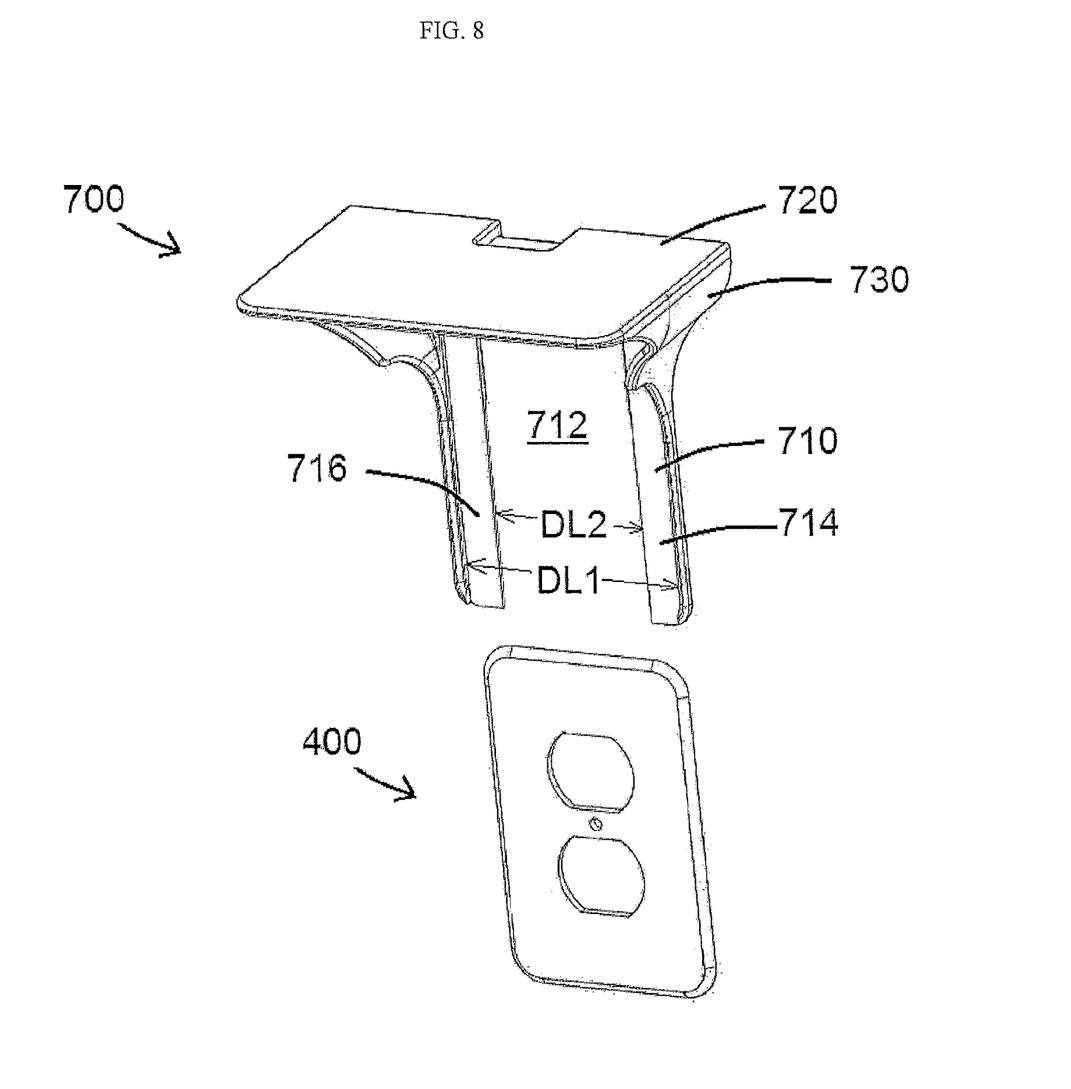
FIG. 8 illustrates a view of a cover in accordance with example embodiments.

FIG. 8 is a view of another cover 700 in accordance with example embodiments. As shown in FIG. 8, cover 700 may include an attachment member 710, a shelf 720, and a pair of stiffeners 730. In example embodiments, the attachment member 710 may have a recess 712 formed therein and a pair of lips 714 an 716. In example embodiments, the lips 714 and 716 may provide a surface onto which a conventional cover 400 may be placed. Outer edges of the lips 714 and 716 may be spaced apart by a distance DL1, for example, about 2.75 inches, to allow the cover 400 to bear against the lips 714 and 716 and inner edges of the lips 714 and 716 may be spaced apart by a second distance DL2, for example, about 1.25 inches or more, to provide access to the electrical socket which it may cover. In example embodiments, the cover 700 may be installed around a conventional electrical socket by simply loosening fasteners that connect the cover 400 to a socket, and moving the cover 400 away from a wall to which it is engaged and then sliding the cover 700 behind the cover 400 and then tightening the fasteners so the lips 714 and 716 are sandwiched between a wall and the cover 400. An advantage cover 800 has over cover 200 is that the cover 400 does not need to be completely detached from a socket in order to install cover 700.

Figure 9A:
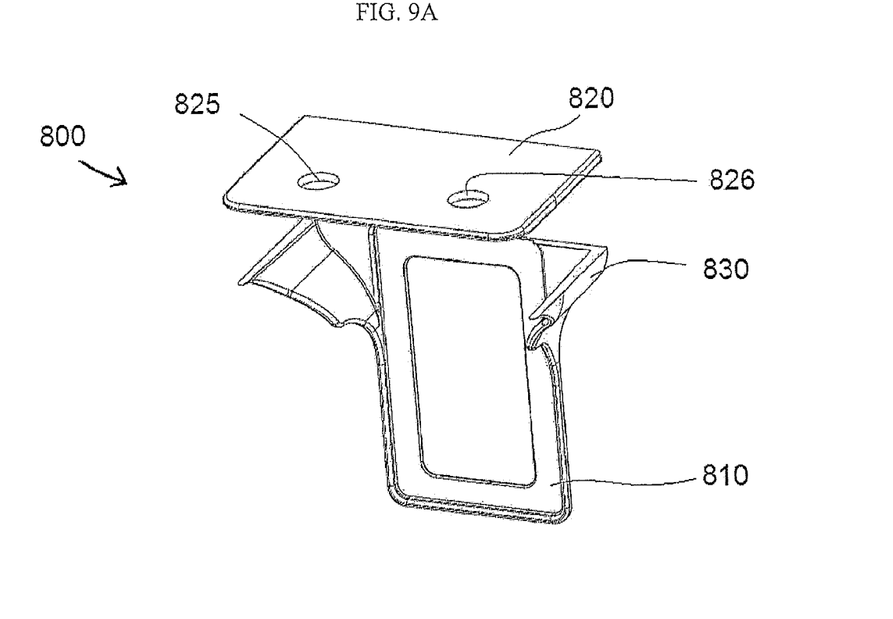
FIGS. 9A-9B illustrate views of a cover in accordance with example embodiments.
Figure 9B:
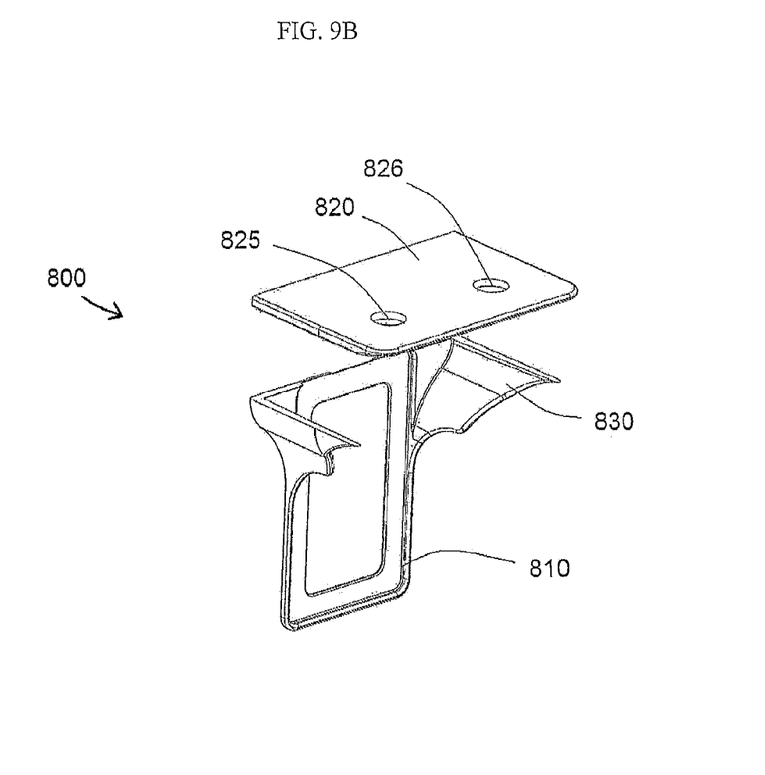

FIGS. 9A and 9B illustrate another cover 800 in accordance with example embodiments. The embodiment of FIGS. 9A and 9B are similar to the embodiment of FIGS. 7A and 7B. For example, the cover 800 of FIGS. 9A and 9B include a shelf 820, an attachment member 810, and stiffeners 830 like the shelf 620, attachment member 610, and stiffeners 630. However, unlike cover 600, the cover 820 includes a plurality of apertures 825 and 826. Although the cover 820 only shows two apertures, it is clear the number of apertures may be greater than two. In example embodiments, the plurality of aperture 825 and 826 may allow electrical cords to pass through the shelf 820 to allow devices supported by the shelf to receive power.

Figure 10A:
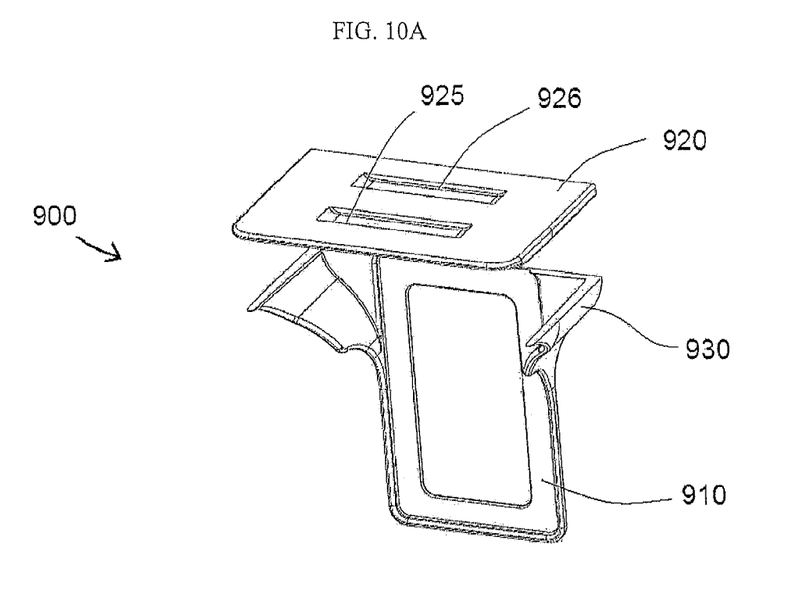
FIGS. 10A-10B illustrate views of a cover in accordance with example embodiments.
Figure 10B:
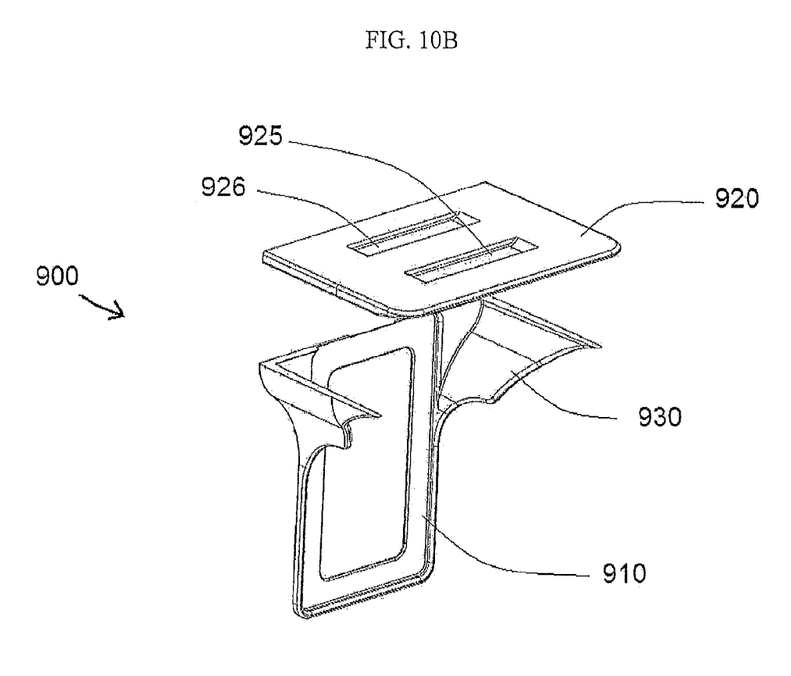

FIGS. 10A and 10B illustrate another cover 900 in accordance with example embodiments. The embodiment of FIGS. 10A and 10B is similar to the embodiment of FIGS. 7A and 7B. For example, the cover 900 of FIGS. 10A and 10B includes a shelf 920, an attachment member 910, and stiffeners 930 like the shelf 620, attachment member 610, and stiffeners 630. However, unlike cover 600, the shelf 920 of the cover 900 includes at least one groove in the shelf 920. The at least one groove may be embodied as a first groove 925 and a second groove 926 but may alternatively be embodied as a single groove or more than two grooves. In example embodiments, the at least one groove may allow electrical devices to hook onto the shelf 920 in the event the shelf is sloped downwards.

Figure 11A:
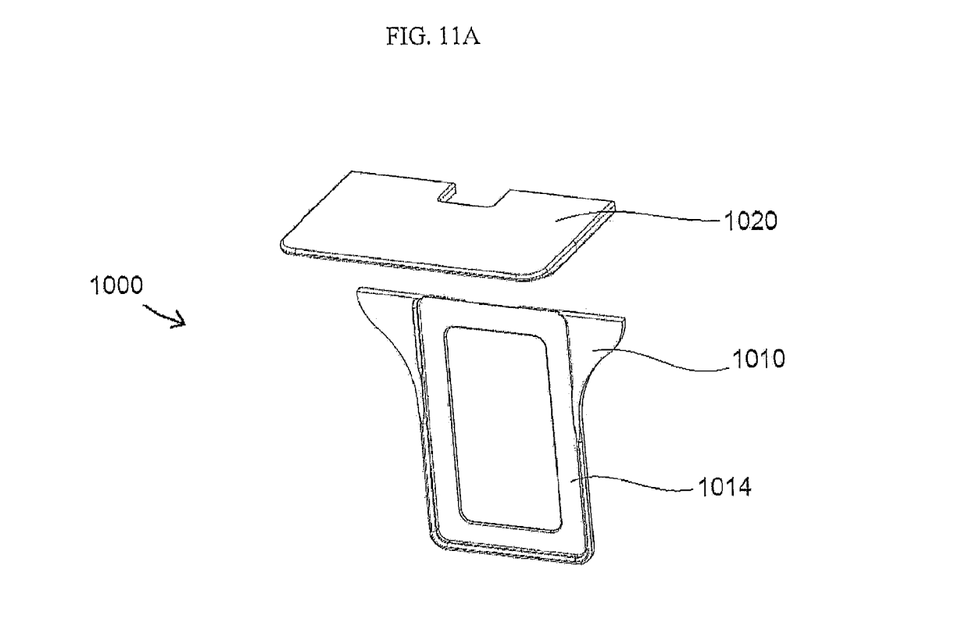
FIGS. 11A-11B illustrate views of a cover in accordance with example embodiments.
Figure 11B:
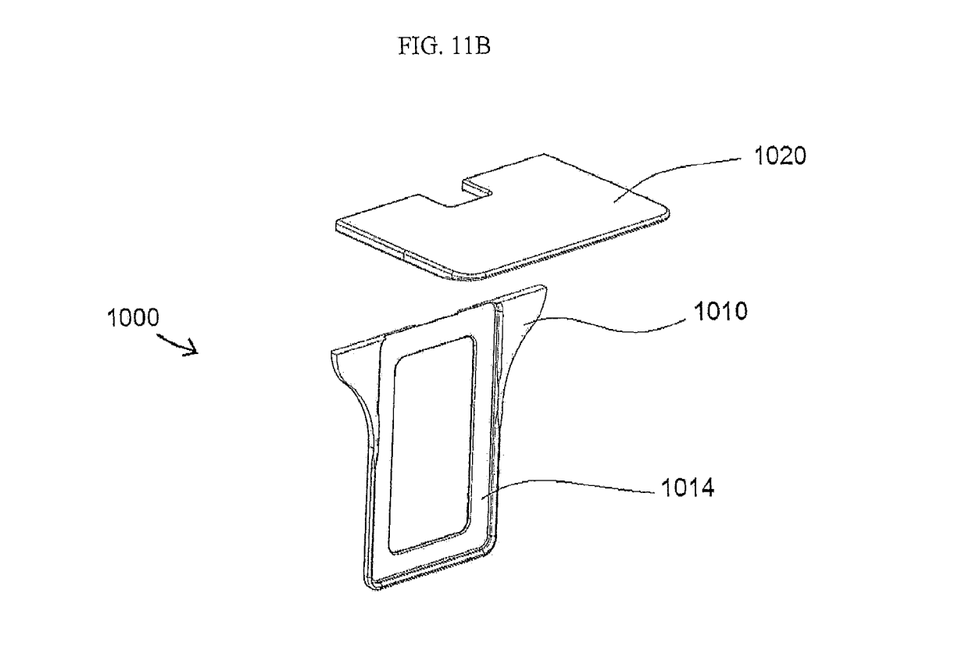

FIGS. 11A and 11B illustrate another cover 1000 in accordance with example embodiments. The embodiment of FIGS. 11A and 11B are similar to the embodiment of FIGS. 7A and 7B. For example, the cover 1000 of FIGS. 11A and 11B includes a shelf 920 and an attachment member 910, however, unlike the embodiment of FIGS. 7A and 7B, the cover 1000 does not include stiffeners.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

I claim:

1. A method of attaching a cover to a wall, the method comprising:

removing a fastener fastening a rectangular socket cover to an electrical socket;

removing the rectangular socket cover to expose the electrical socket;

arranging said cover over the electrical socket, said cover including an attachment member having a first aperture configured to expose the electrical socket, the attachment member having a receiving area around the first aperture for receiving the rectangular socket cover, said cover further including a shelf substantially perpendicular to the attachment member and a pair of stiffeners extending from the shelf to the attachment member, wherein said cover is arranged so that the first aperture exposes the electrical socket and the attachment member bears up against said wall;

placing the rectangular socket cover onto the receiving area of the attachment member to sandwich the receiving area between the rectangular socket cover and the wall; and connecting the rectangular socket cover to the electrical socket using the fastener.

2. The method of claim 1, wherein the receiving area includes a lip into which the rectangular socket cover is inserted.

3. The method of claim 1, wherein the fastener is a screw.

* * * * *